(12) United States Patent
Ficarra et al.

(10) Patent No.: US 10,834,101 B2
(45) Date of Patent: Nov. 10, 2020

(54) APPLYING BYTECODE OBFUSCATION TECHNIQUES TO PROGRAMS WRITTEN IN AN INTERPRETED LANGUAGE

(71) Applicant: Shape Security, Inc., Santa Clara, CA (US)

(72) Inventors: Michael J. Ficarra, Mountain View, CA (US); Kevin Gibbons, Mountain View, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 340 days.

(21) Appl. No.: 15/453,048

(22) Filed: Mar. 8, 2017

(65) Prior Publication Data

US 2017/0264623 A1   Sep. 14, 2017

Related U.S. Application Data

(60) Provisional application No. 62/306,022, filed on Mar. 9, 2016.

(51) Int. Cl.
*H04L 29/06* (2006.01)
*G06F 9/455* (2018.01)
(Continued)

(52) U.S. Cl.
CPC ...... *H04L 63/1416* (2013.01); *G06F 9/30021* (2013.01); *G06F 9/455* (2013.01);
(Continued)

(58) Field of Classification Search
CPC ........... H04L 63/1416; H04L 2463/144; G06F 9/30021; G06F 9/455; G06F 9/45504;
(Continued)

(56) References Cited

U.S. PATENT DOCUMENTS 6,139,199 A    10/2000  Rodriguez
6,668,325 B1   12/2003  Collberg
(Continued)

FOREIGN PATENT DOCUMENTS

WO   WO2013091709   6/2013
WO   WO 2017/007936  1/2017

OTHER PUBLICATIONS

CTNF, dated Dec. 26, 2018, re: Siying Yang, U.S. Appl. No. 15/242,062, filed Aug. 19, 2016.
(Continued)

*Primary Examiner* — Kristine L Kincaid
*Assistant Examiner* — Alexander R Lapian
(74) *Attorney, Agent, or Firm* — Troutman Pepper Hamilton Sanders LLP (Rochester)

(57) ABSTRACT

In an embodiment, a computer system configured to improve security of client computer interacting with server computers comprises one or more processors; a digital electronic memory storing a set of program instructions which when executed using the one or more processors cause the one or more processors to: process a first set of original instructions that produce a first set of outputs or effects; generate a first set of interpreter instructions that define a first interpreter; generate a first set of alternate instructions from the first set of original instructions, wherein the first set of alternate instructions is functionally equivalent to the first set of original instructions when the first set of alternate instructions is executed by the first interpreter; send, to the first client computer, the first set of alternate instructions and the first set of interpreter instructions.

20 Claims, 5 Drawing Sheets

(51) Int. Cl.
  *G06F 21/71* (2013.01)
  *G06F 9/30* (2018.01)

(52) U.S. Cl.
  CPC ...... *G06F 9/45504* (2013.01); *G06F 9/45529* (2013.01); *G06F 21/71* (2013.01); *H04L 2463/144* (2013.01)

(58) Field of Classification Search
  CPC .. G06F 9/45529; G06F 9/45508; G06F 9/547; G06F 21/14; G06F 21/71; G06F 8/41
  See application file for complete search history.

(56) References Cited

U.S. PATENT DOCUMENTS

| | | |
|---|---|---|
| 7,620,987 B2 | 11/2009 | Shelest |
| 7,770,106 B2 | 8/2010 | Waldman |
| 7,975,308 B1 | 7/2011 | Satish |
| 8,392,910 B1 | 3/2013 | Asher |
| 8,424,090 B2 | 4/2013 | Kang |
| 8,510,571 B1 | 8/2013 | Chang |
| 8,661,549 B2 | 2/2014 | Chevallier-Mames |
| 8,806,187 B1 | 8/2014 | Vemula |
| 8,806,627 B1 | 8/2014 | Aharoni |
| 9,241,004 B1 | 1/2016 | April |
| 9,294,502 B1 | 3/2016 | Benishti |
| 9,582,666 B1 | 2/2017 | Overson |
| 2002/0099827 A1 | 7/2002 | Shah |
| 2004/0010714 A1* | 1/2004 | Stewart ............. H04L 63/08 726/7 |
| 2004/0162994 A1 | 8/2004 | Cohen |
| 2005/0132068 A1* | 6/2005 | Rajamony ............. H04L 43/00 709/228 |
| 2005/0183072 A1 | 8/2005 | Horning et al. |
| 2006/0195703 A1 | 8/2006 | Jakubowski |
| 2006/0253687 A1 | 11/2006 | Jakubowski |
| 2007/0234070 A1 | 10/2007 | Horning |
| 2008/0183902 A1 | 7/2008 | Cooper |
| 2008/0222736 A1 | 9/2008 | Boodaei |
| 2009/0077383 A1 | 3/2009 | de Monseignat |
| 2009/0119515 A1 | 5/2009 | Nicolson |
| 2009/0144829 A1 | 6/2009 | Grigsby |
| 2009/0193513 A1 | 7/2009 | Agarwal |
| 2009/0235089 A1 | 9/2009 | Ciet |
| 2010/0005527 A1* | 1/2010 | Jeon ............. G06F 9/547 726/22 |
| 2010/0257354 A1 | 10/2010 | Johnston |
| 2010/0281459 A1 | 11/2010 | Betouin |
| 2011/0035733 A1 | 2/2011 | Horning |
| 2011/0107077 A1 | 5/2011 | Henderson |
| 2011/0131416 A1 | 6/2011 | Schneider |
| 2011/0138373 A1 | 6/2011 | Lane et al. |
| 2011/0239113 A1 | 9/2011 | Hung |
| 2012/0022942 A1 | 1/2012 | Holloway |
| 2012/0124372 A1 | 5/2012 | Dilley |
| 2012/0159193 A1 | 6/2012 | Spradlin et al. |
| 2013/0067225 A1 | 3/2013 | Shochet |
| 2013/0152071 A1 | 6/2013 | Asher |
| 2014/0165197 A1 | 6/2014 | Ur |
| 2014/0223290 A1 | 8/2014 | Hathaway |
| 2015/0039962 A1 | 2/2015 | Fonseka |
| 2015/0096006 A1 | 4/2015 | Chu |
| 2015/0278491 A1 | 10/2015 | Horning |
| 2016/0359901 A1 | 12/2016 | Yang |
| 2017/0012960 A1 | 1/2017 | Idika |
| 2017/0024230 A1* | 1/2017 | Li ............. G06F 8/41 |
| 2017/0041341 A1 | 2/2017 | Wang |
| 2017/0264623 A1 | 9/2017 | Ficarra |
| 2018/0077160 A1* | 3/2018 | Call ............. H04L 63/08 |
| 2018/0121680 A1 | 5/2018 | Wang |
| 2018/0159830 A1 | 6/2018 | Gibbons |
| 2019/0243951 A1 | 8/2019 | Hansen |
| 2019/0245833 A1 | 8/2019 | Overson |

OTHER PUBLICATIONS

CTFR, dated Jan. 17, 2019, re: Wesley Hales, U.S. Appl. No. 15/011,237, filed Jan. 29, 2016.
CTFR, dated Jun. 7, 2019, re: Siying Yang, U.S. Appl. No. 15/242,062, filed Aug. 19, 2016.
CTNF, dated Jun. 5, 2019, re: Xinran Wang, U.S. Appl. No. 15/859,694, filed Jan. 1, 2018.
CTNF, dated Aug. 8, 2019, re: Marc R. Hansen, U.S. Appl. No. 16/233,455, filed Dec. 27, 2018.
CTFR, dated Oct. 1, 2019, re: Xinran Wang, U.S. Appl. No. 15/859,694, filed Jan. 1, 2018.
CTNF, dated Sep. 30, 2019, re: Justin Call, U.S. Appl. No. 15/808,504, filed Nov. 9, 2017.
NOA, dated Aug. 24, 2015, re: Subramanian Varadarajan, U.S. Appl. No. 14/290,805, filed May 29, 2014.
CTFR, dated Jan. 14, 2015, re: Subramanian Varadarajan, U.S. Appl. No. 14/290,805, filed May 29, 2014.
CTNF, dated Sep. 5, 2014, re: Subramanian Varadarajan, U.S. Appl. No. 14/290,805, filed May 29, 2014.
NOA, dated Apr. 27, 2016, re: Siying Yang, U.S. Appl. No. 14/481,835, filed Sep. 9, 2014.
CTNF, dated Oct. 28, 2015, re: Siying Yang, U.S. Appl. No. 14/481,835, filed Sep. 9, 2014.
NOA, dated May 24, 2016, re: Siying Yang, U.S. Appl. No. 14/481,835, filed Sep. 9, 2014.
NOA, dated Jul. 25, 2016, re: Siying Yang, U.S. Appl. No. 14/481,835, filed Sep. 9, 2014.
CTNF, dated Aug. 12, 2016, re: Jarrod Overson, U.S. Appl. No. 14/706,346, filed May 7, 2015.
NOA, dated Oct. 19, 2016, re: Jarrod Overson, U.S. Appl. No. 14/706,346, filed May 7, 2015.
CTFR, dated Aug. 12, 2016, re: Subramanian Varadarajan, U.S. Appl. No. 14/923,603, filed Oct. 27, 2015.
NOA, dated Dec. 1, 2016, re: Subramanian Varadarajan, U.S. Appl. No. 14/923,603, filed Oct. 27, 2015.
CTNF, dated Apr. 4, 2017, re: Jarrod Overson, U.S. Appl. No. 15/069,667, filed Mar. 14, 2016.
CTNF, dated Aug. 4, 2017, re: Siying Yang, U.S. Appl. No. 15/242,062, filed Aug. 19, 2016.
NOA, dated Sep. 18, 2017, re: Xinran Wang, U.S. Appl. No. 14/286,324, filed May 23, 2014.
NOA, dated Oct. 25, 2017, re: Xinran Wang, U.S. Appl. No. 14/286,324, filed May 23, 2014.
CTFR, dated Oct. 30, 2017, re: Jarrod Overson, U.S. Appl. No. 15/069,667, filed Mar. 14, 2016.
NOA, dated Nov. 29, 2017, re: Xinran Wang, U.S. Appl. No. 14/286,324, filed May 23, 2014.
CTFR, dated Feb. 23, 2018, re: Wesley Hayes, U.S. Appl. No. 15/011,237, filed Jan. 29, 2016.
CTFR, dated Apr. 9, 2018, re: Siying Yang, U.S. Appl. No. 15/242,062, filed Aug. 19, 2016.
CTNF, dated May 23, 2018, re: Jarrod Overson, U.S. Appl. No. 15/069,667, filed Mar. 14, 2016.
CTNF, dated Feb. 1, 2018, re: Nwokedi Idika, U.S. Appl. No. 15/204,710, filed Jul. 7, 2016.
CTNF, dated Jul. 31, 2018, re: Wesley Hales, U.S. Appl. No. 15/011,237, filed Jan. 29, 2016.
NOA, dated Sep. 19, 2018, re: Nwokedi Idika, U.S. Appl. No. 15/204,710, filed Jul. 7, 2016.
NOA, dated Oct. 24, 2018, re: Jarrod Overson, U.S. Appl. No. 15/069,667, filed Mar. 14, 2016.
NOA, dated Nov. 27, 2018, re: Nwokedi Idika, U.S. Appl. No. 15/204,710, filed Jul. 7, 2016.
CTNF, dated Jan. 9, 2019, re: Michael J. Ficarra, U.S. Appl. No. 15/453,048, filed Mar. 8, 2017.
In-the-wire authentication: Protecting client-side critical data fields in secure network transactions,Jan. 14, 2009.

(56) References Cited

OTHER PUBLICATIONS

International Search Report, dated Oct. 11, 2016, PCT/US16/41337.
International Search Report for PCT/US17/21409, dated May 23, 2017.
European Search Report for Corresponding EP Application Serial No. 17764019.0, dated Feb. 4, 2020.

* cited by examiner

APPLYING BYTECODE OBFUSCATION TECHNIQUES TO PROGRAMS WRITTEN IN AN INTERPRETED LANGUAGE

BENEFIT CLAIM

This application claims the benefit under 35 U.S.C. §119 (e) of provisional application 62/306,022, filed Mar. 9, 2016, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to security techniques applicable to client/server systems, and relates more specifically to techniques for improving the security of client computers interacting with server computers through an intermediary computer using bytecode conversion techniques. SUGGESTED GROUP ART UNIT: 2441; SUGGESTED

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer program applications that may request and execute instructions received from a web server to generate complex user interfaces that are presented to a user through one or more devices, such as a monitor or speakers. In response to input from a user, such as a mouse click indicating that the user selected an object defined in the instructions, such as a link, a browser may send a request based on the selected object to the web server. The request may be a request for data and/or include data to be processed by the web server.

Attackers may use software, often referred to as a "bot," which imitates a browser by receiving instructions from a web server and generating requests based on those instructions. For example, a bot may receive a web page, gather data in one or more objects defined in the web page, and generate a request for another web page to gather additional data, as if a user using a browser was requesting a new web page. Also for example, a bot may generate and send a request with data assigned to one or more parameters to simulate a user submitting data to a web server through a browser.

Attackers may use bots to commit many types of unauthorized acts, crimes, or computer fraud, such as content scraping, ratings manipulation, fake account creation, reserving rival goods attacks, ballot stuffing attacks, password snooping, web site scraping attacks, vulnerability assessments, and stack fingerprinting attacks. As a specific example, a malicious user may cause a bot to traverse through pages of a web site and collect private and/or proprietary data, such as who is connected with whom on a particular social network site.

Web server administrators may wish to prevent malicious users from attacking the site, while allowing legitimate users to use the site as intended. However, determining which requests are generated by a legitimate user using a web browser and a malicious user using a bot may be difficult.

SUMMARY

The appended claims may serve as a summary of the invention.

Figure 1:
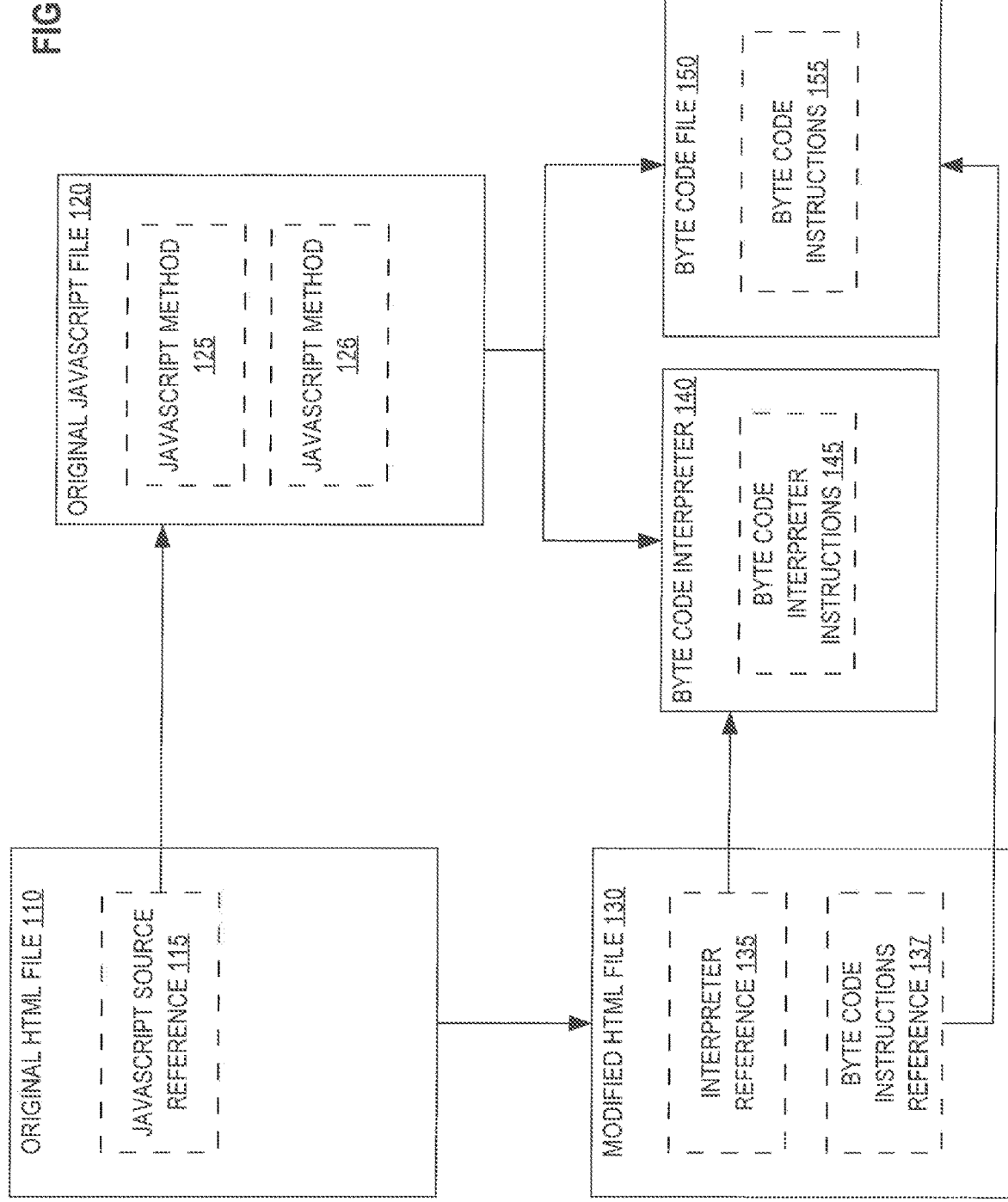
FIG. 1 illustrates a modified HTML file and a bytecode file generated from an original HTML file and an original JavaScript file according to one or more bytecode conversion techniques.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments. Furthermore, while the instructions discussed in many example embodiments are HyperText Markup Language ("HTML") and JavaScript instructions, in other embodiments, the instructions intercepted and generated may be any other standard and/or proprietary instructions configured to be executed by a client computer.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Furthermore, words, such as "or" may be inclusive or exclusive unless expressly stated otherwise. A set of items may comprise one or more items.

Embodiments are described herein according to the following outline:

1.0 General Overview
  2.0 Browsers, Bots, and Attacks
  2.1 Bytecode
  3.0 Bytecode Conversion
  4.0 Network Topology
  4.1 Web Infrastructure
  4.2 Intermediary Computer
    4.2.1 Protocol Client Logic
    4.2.2 Processing Logic
    4.2.3 Bytecode Conversion Logic 4.2.4 Protocol Server Logic
4.2.5 Configurations
4.2.6 Storage
4.3 Browser
5.0 Process Overview
5.1 Receiving Instructions from a Server Computer
5.2 Determining Alternate Instructions
  5.2.1 Additional Example
  5.2.2 Generating Alternate Sets of Functionally Equivalent Code and Corresponding Interpreters
5.3 Generating and Sending Alternate Instructions
6.0 Hardware Overview
7.0 Other Aspects of Disclosure
1.0 General Overview In an embodiment, a computer system configured to improve security of client computers interacting with server computers, the computer system comprising: one or more processors; a digital electronic memory storing a set of program instructions which when executed using the one or more processors cause the one or more processors to: process a first set of original instructions that produce a first set of outputs or effects when executed by a first client computer; generate a first set of interpreter instructions that define a first interpreter; generate a first set of alternate instructions from the first set of original instructions, wherein the first set of alternate instructions is functionally equivalent to the first set of original instructions when the first set of alternate instructions is executed by the first interpreter; send, to the first client computer, the first set of alternate instructions and the first set of interpreter instructions, wherein the first set of interpreter instructions and the first set of alternate instructions, when executed by the first client computer, cause the first client computer to produce the first set of outputs or effects.

In an embodiment, a computer system configured to improve security of client computer interacting with server computers comprises one or more processors; a digital electronic memory storing program instructions which when executed using the one or more processors cause the one or more processors to: receive, from a server computer, a first set of instructions that define one or more objects and one or more operations, which when executed by a client computer operate on the one or more objects; determine that the first set of instructions comprises one or more particular instructions that are functionally equivalent to one or more first alternate instructions when executed by an interpreter; generate a second set of instructions that includes a set of interpreter instructions that define the interpreter, the one or more first alternate instructions, and the first set of instructions without the one or more particular instructions; send the second set of instructions to a remote client computer.

In an embodiment, the interpreter is a bytecode interpreter.

In an embodiment, the one or more first alternate instructions are bytecode instructions.

In an embodiment, wherein as part of sending the second set of instructions to the remote client computer, executing the program instructions causes the one or more processors to obfuscate the bytecode instructions.

In an embodiment, wherein executing the program instructions causes the one or more processors to: generate, in memory, one or more data structures that are associated with the one or more objects and one or more operations; and determine, based on the one or more data structures, that the first set of instructions comprises one or more particular instructions that are functionally equivalent to one or more first alternate instructions when the one or more first alternate instructions are executed by an interpreter.

In an embodiment, wherein the one or more data structures describe at least one of: the syntax of the one or more objects and the one or more operations, or the semantics of the one or more objects and the one or more operations.

In an embodiment, wherein the one or more particular instructions are functionally equivalent to a plurality of alternative instruction sets, and wherein executing the program instructions causes the one or more processors to select the one or more first alternate instructions from the plurality of alternative instruction sets, prior to generating the second set of instructions.

2.0 Browsers, Bots, and Attacks

A web browser may be a tool through which server-based application programs can provide client computers with content in a dynamic, custom UI. For example, in response to receiving a request for data from a web browser, a web server may respond with a set of instructions that define one or more objects with one or more object identifiers. The instructions may use the object identifiers to define how objects may be presented in a UI to enable human/computer interaction. For convenience of expression, a set of instructions may be referred to herein as a file and/or web page. A set of instructions, file, and/or web page need not have a particular type or extension, and need not be stored in persistent storage. For example, a web page may be generated dynamically based on one or more parameters. While some files may be identified as a particular type of file, such as an "HTML file" or "JavaScript file," a file may include mixed content. For example, an HTML file may include HTML, JavaScript, Cascading Style Sheets ("CSS"), and/or any other standard and/or proprietary set of instructions. Furthermore, a file need not be a file stored in persistent storage.

In contrast, bots traverse web pages and/or web sites to retrieve data from, and/or submit data to, one or more web servers with little, if any, human/computer interaction. For example, in response to receiving a request for data from a bot, a web server may respond with a set of instructions. A bot may parse the instructions to collect data from, and/or to store data in, particular objects with particular object identifiers. A bot may also make requests based on an object identifier, such as the identifier for a text field input. However, unlike a browser, a bot need not execute the instructions that define how objects should be presented in a UI because the bot is built to operate with little, if any, human/computer interaction. Thus, a bot may be a functionally-limited browser. For example, a browser may include a JavaScript runtime environment, which executes JavaScript instructions that define how one or more objects are presented to a user. However, a bot need not include a JavaScript runtime environment because a bot need not present objects to a user.

An attacker may use object identifiers in various attacks, such as a man-in-the-browser attack. In a man-in-the-browser attack, malicious code may be injected in a web browser, which when executed may gather data that is entered by a user into particular fields with particular identifiers before the data is encrypted and sent to the intended recipient. For example, a user may enter account information into a web browser that is displaying a web page from the user's bank. The web page may be a login page to access the user's account information and funds. The malicious code may scan particular fields with particular identifiers in the web page to collect the user's account information before the user's account information is encrypted and sent to the user's bank. The malicious code may send the collected data from those fields to the attacker's computer.

2.1 Bytecode

Bytecode is a set of one or more instructions that are designed for efficient execution by a software interpreter rather than machine code that is designed to be executed by hardware alone or human-readable code that is designed for programmers to be able to readily read or modify. Unlike human-readable source code, such as HTML or JavaScript, bytecode may comprise compact numeric codes, constants, and references that may encode the result of parsing, compiling, or transpiling one or more sets of human-readable source code. Although human-readable source code may be represented by at least one series of bytecode, not all bytecode directly represents human-readable source code. Thus, it is difficult to de-compile bytecode in order to produce human-readable source code.

3.0 Bytecode Conversion

Bytecode conversion may be used to prevent and/or deter attacks. For example, human-readable JavaScript in a web page may define an original method, which when executed, submits a request to a server computer with data that includes a security token that the server computer may use to validate the request. An attacker may review the human-readable JavaScript, determine what the security token is, or how the original method generates the security code. The attacker may use the function to send one or more requests with purposefully incorrect or false data and a valid security token to the server computer. Additionally or alternatively, the attacker may create a new function that generates a valid security token according to the algorithm defined in the original method and sends a request with purposefully incorrect or false data and the valid security token to the server computer. Converting human-readable code or instructions into non-human readable bytecode, before the human-readable code is sent to a client computer, may prevent attackers from exploiting or simulating the functionality defined by human-readable code, and thus, prevent attackers from performing one or more various attacks, such as a denial of service ("DOS") attack, credential stuffing, fake account creation, ratings or results manipulation, man-in-the-browser attacks, reserving rival goods or services, scanning for vulnerabilities, and/or exploitation of vulnerabilities.

FIG. 1 illustrates a modified HTML file, JavaScript interpreter file, and bytecode file generated from an original HTML document and an original JavaScript document according to an example embodiment. In FIG. 1, original HTML file 110 and original JavaScript file 120 are files comprising instructions that may be stored on, and/or generated by, a web server computer in response to a request from a browser executing on a client computer. A computer, such as the web server computer and/or an intermediary computer, with bytecode conversion logic may receive original HTML file 110 and original JavaScript file 120, and generate modified HTML file 130 and bytecode file 150. The computer may also generate bytecode interpreter 140, which when executed by a browser with a JavaScript runtime environment on a client computer, can configure the runtime environment to interpret or execute bytecode file 150. In an embodiment, bytecode interpreter 140 may be a set of JavaScript instructions. The bytecode conversion logic may send modified HTML file 130, bytecode interpreter 140, and bytecode file 150 to the browser on the client computer that originally requested original HTML file 110. Logic may be hardware and/or software modules executed in concert with, and/or by, one or more computers, such as a web server computer, or a computer coupled to a web server computer.

In FIG. 1, original HTML file 110 comprises JavaScript source reference 115. JavaScript source reference 115 may reference one or more files comprising additional instructions, such as original JavaScript file 120. Original JavaScript file 120 may include one or more methods, such as JavaScript methods 125 and 126, which comprise one or more instructions.

To hinder or prevent attackers from identifying the instructions defined in JavaScript methods 125 and 126, the bytecode conversion logic may convert the instructions in method 125 and method 126 to bytecode. Modified HTML file 130 is an example HTML file that the bytecode conversion logic may generate in response to receiving original HTML file 110. Modified HTML file 130 comprises interpreter reference 135 and bytecode instruction reference 137. Bytecode instruction reference 137 may reference one or more files comprising one or more generated instructions, such as bytecode file 150. Bytecode file 150 is an example bytecode file that the bytecode conversion logic may generate in response to receiving original JavaScript file 120. Interpreter reference 135 may reference one or more files comprising interpreter instructions, such as bytecode interpreter 140. Bytecode interpreter 140 may include one or more sets of bytecode interpreter instructions 145, which may be used to interpret bytecode instructions 155. Additionally or alternatively, modified HTML file 130 may include instructions defining bytecode interpreter 140 and bytecode instructions 155.

4.0 Network Topology

Figure 2:
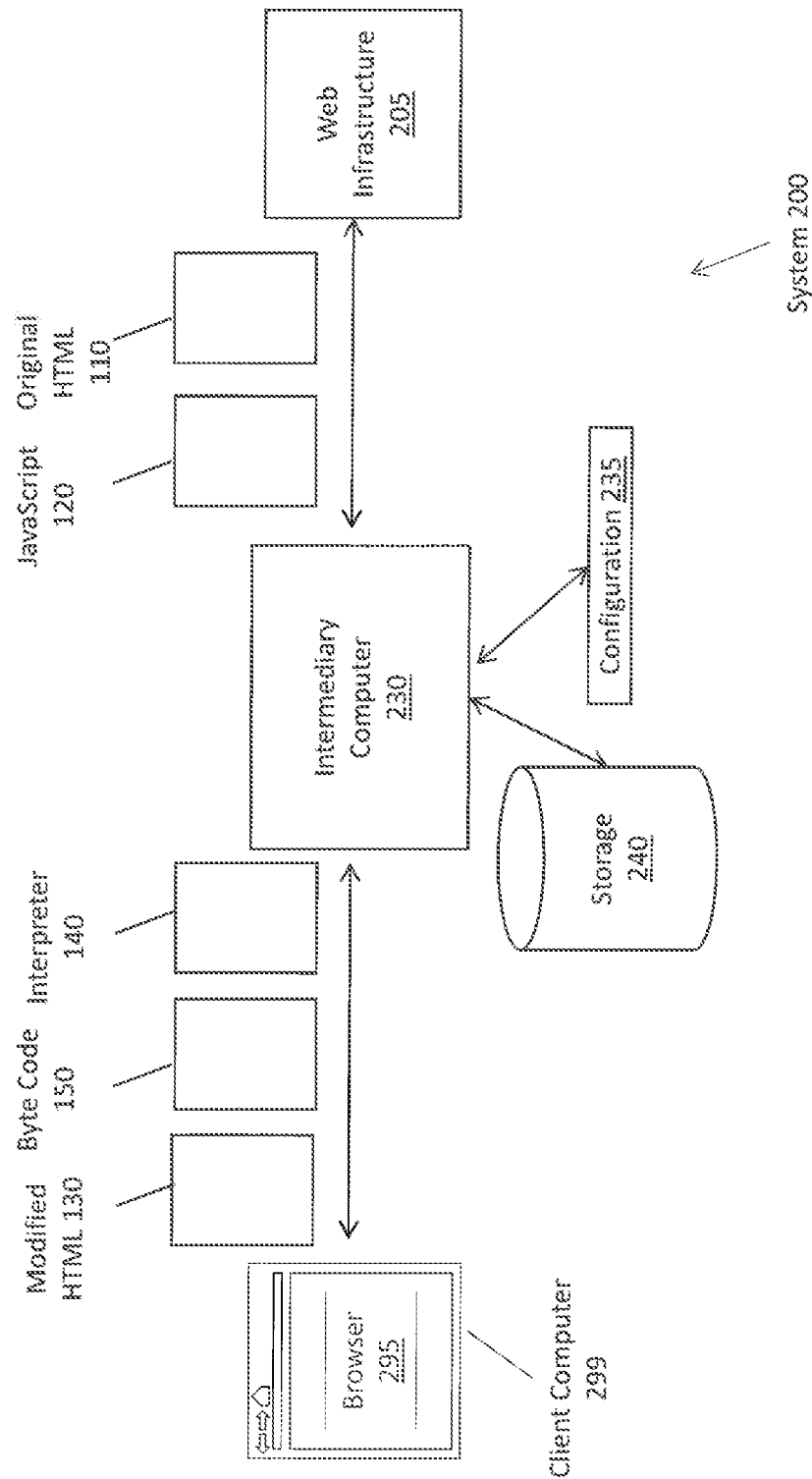
FIG. 2 illustrates a computer system comprising a browser, a web infrastructure, and an intermediary computer, which may be configured to perform one or more bytecode conversion techniques, in an example embodiment.

FIG. 2 illustrates a computer system comprising a browser, a web infrastructure, and an intermediary computer, which may be configured to generate a web page, convert one or more human-readable instructions in the web page into bytecode, and execute the bytecode instructions on a client computer, in an example embodiment. In FIG. 2, system 200 comprises web infrastructure 205, client computer 299, intermediary computer 230, storage 240, and configuration 235 distributed across one or more interconnected computer networks.

While each of the components listed above is illustrated as if running on a separate, remote computer from each other, one or more of the components listed above may be part of and/or executed on the same computer. For example, intermediary computer 230, configuration 235, storage 240, and/or web infrastructure 205 may be executed on the same computer, local area, and/or wide area network. Additionally or alternatively, intermediary computer 230 may be a proxy server and/or layer for web infrastructure 205. Additionally or alternatively, intermediary computer 230 may be in line between a router and web infrastructure 205, such that intermediary computer 230 may intercept all network data sent to, and/or sent from, web infrastructure 205 over one or more protocols. Additionally or alternatively, intermediary computer 230, and/or one or more modules and/or logic comprising intermediary computer 230 discussed herein, may be a software layer between, and/or executed on, web infrastructure 205 and/or a component of web infrastructure 205. Additionally or alternatively, intermediary computer 230, and/or one or more modules and/or logic comprising intermediary computer 230 discussed herein, may be part of a server-side application that responds to requests over one or more standard and/or proprietary protocols, such as Hypertext Transfer Protocol ("HTTP") and/or any other protocol.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

4.1 Web Infrastructure

Web infrastructure 205 may comprise one or more server computers that receive requests for data from users through one or more client computers, such as client computer 299 and/or intermediary computer 230. Web infrastructure 205 may respond by sending data to the browser that sent the request. As illustrated in FIG. 2, the data sent from web infrastructure 205 may include one or more types of instructions, such as HTML, JavaScript, CSS, and/or any other standard or proprietary instructions. The one or more computers in web infrastructure 205 may, but need not, be owned and/or managed by one or more independent entities and may span across one or more computer networks, such as the Internet.

A server computer may be a computer that receives requests for data and responds with data. For example, a web server computer may be an HTTP-based computer that receives HTTP requests and responds with data comprising HTML and/or JavaScript instructions. Additionally or alternatively, a server computer may respond with data that references data on other server computer in, and/or outside of, web infrastructure 205.

4.2 Intermediary Computer

Intermediary computer 230 may be an intermediary that may intercept instructions sent from web infrastructure 205, parse and/or execute one or more of the intercepted instructions, modify the intercepted instructions, generate and/or add new instructions, and send the modified and/or new instructions to a client computer. For example, intermediary computer 230 may receive original HTML file 110 and original JavaScript file 120, generate modified HTML file 130 and bytecode file 150, and send modified HTML file 130, bytecode interpreter 140, and bytecode file 150 to browser 295.

Intermediary computer 230 may be an HTTP or SPDY intermediary that intercepts, parses, executes, and/or processes HTML, JavaScript, and CSS instructions. Additionally or alternatively, intermediary computer 230 may intercept requests for data and/or instructions from a client application, generate a new HTTP request, and send the newly generated HTTP request to one or more HTTP and/or SPDY-based web servers. Additionally or alternatively, intermediary computer 230 may be an intermediary for any other standard and/or proprietary protocol. Furthermore, each of the components discussed herein, which intermediary computer 230 is comprised of, may be configured to perform any of the processes and/or methods discussed herein for any standard and/or proprietary protocol.

Intermediary computer 230 may be a server computer that one or more domain name servers or other elements of the domain name system ("DNS") identify in DNS records as a destination network address associated with one or more internet domain names. Accordingly, intermediary computer 230 may receive requests sent to the one or more domains from a browser or bot. Based on using DNS to resolve the domain name in a request to a network address, intermediary computer 230 may forward the request, or a modified request, to a server computer in web infrastructure 205.

In FIG. 2, intermediary computer 230 is programmed to send instructions to, and receive requests from, a particular type of client application: browser 295. However, in an embodiment, intermediary computer 230 may be programmed to send instructions to, receive requests from, and/or open sockets with, browsers and/or bots.

Figure 3:
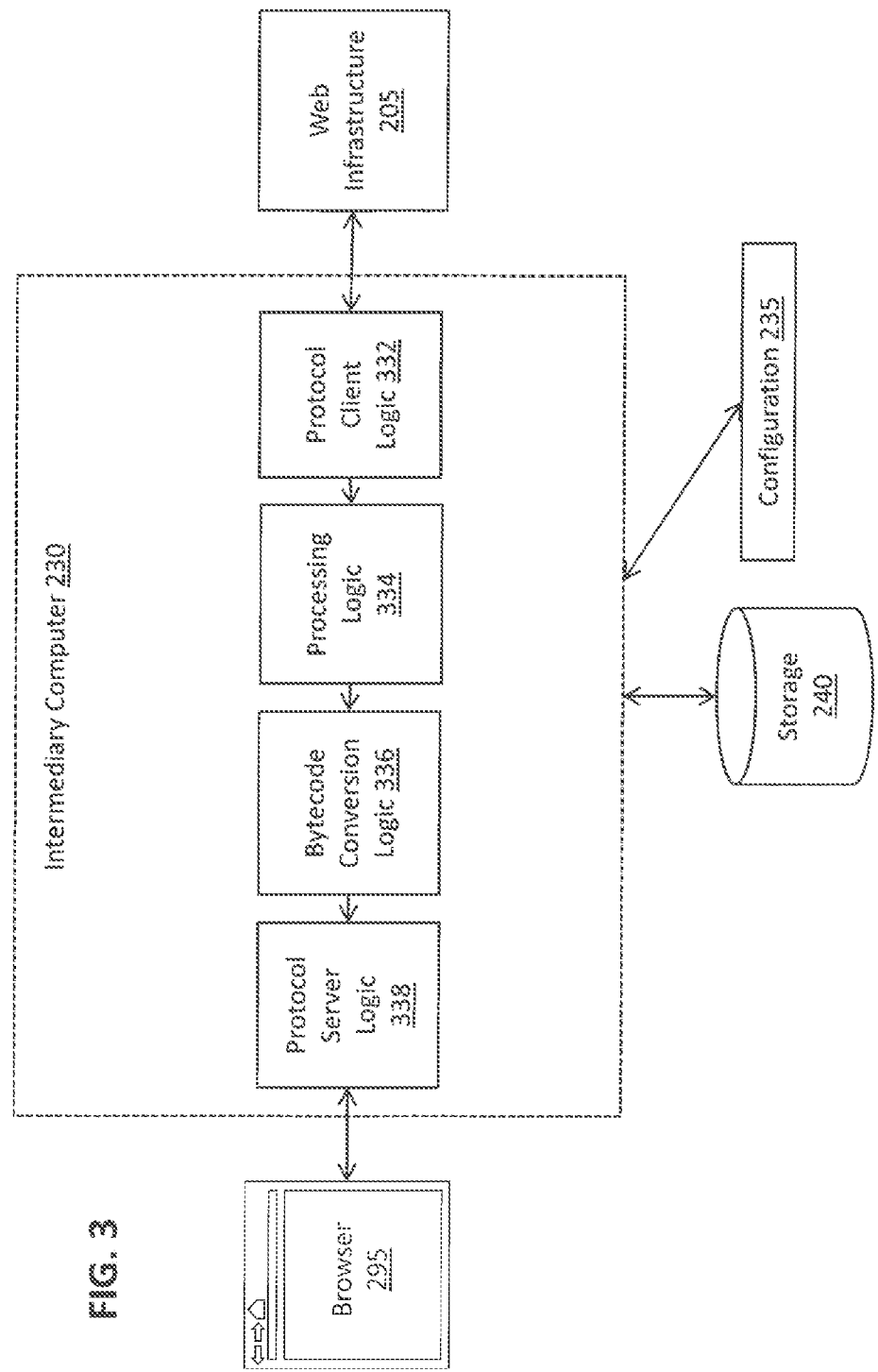
FIG. 3 illustrates a detailed view of an intermediary computer in an example embodiment.

FIG. 3 illustrates a detailed view of an intermediary computer in an example embodiment. In FIG. 3, intermediary computer 230 comprises protocol client logic 332, processing logic 334, bytecode conversion logic 336, and protocol server logic 338. In an embodiment, each of the logical and/or functional unites of intermediary computer 230 may be implemented using any of the techniques further described herein in connection with FIG. 4. For example, the intermediary computer 230 may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices and/or modules being communicatively couple, each of the computers, devices, modules, storage, and configurations may be communicatively coupled with each other.

4.2.1 Protocol Client Logic

Protocol client logic 332 may intercept or receive data over any standard or proprietary protocol. For example, protocol client logic 332 may intercept or receive data over HTTP. Protocol client logic 332 may send one or more requests to a server computer, such as a computer is web infrastructure 205.

4.2.2 Processing Logic

Processing logic 334 may process instructions intercepted or received by protocol client logic 332, which causes processing logic 334 to generate one or more in-memory data structures that correspond to one or more objects. Processing one or more instructions may comprise parsing and/or executing the one or more instructions. After processing the instructions, processing logic 334 may notify bytecode conversion logic 336 to begin rendering instructions based on the one or more data structures.

Processing logic 334 may make requests for additional data. For example, if instructions received from protocol client logic 332 reference one or more instruction files, then processing logic 434 may request the one or more instruction files through protocol client logic 432.

4.2.3 Bytecode Conversion Logic

Bytecode conversion logic 336 may generate a set of one or more bytecode instructions to replace one or more original instructions in original JavaScript file 120. Bytecode conversion logic 336 may generate the one or more bytecode instructions based on the one or more data structures in memory.

Bytecode conversion logic 336 may render an alternate set of instructions based on the generated set of one or more bytecode instructions, such as modified HTML file 130. Additionally or alternatively, bytecode conversion logic 336 may generate one or more instructions defining an interpreter to execute the generated bytecode instructions, such as bytecode interpreter 140. Bytecode conversion logic 336 may send the alternate instructions to one or more client computers through protocol server logic 338.

4.2.4 Protocol Server Logic

Protocol server logic 338 may receive the instructions generated by bytecode conversion logic 336 and send the generated instructions to client computer 299. Protocol server logic 338 may receive requests from one or more client computers, such as client computer 299.

4.2.5 Configurations

Configuration 242 may be a database, a configuration file, and/or any other system that stores configurations: settings, preferences, and/or protocols. Configuration 242 may store more than one configuration for one or more web servers in web infrastructure 205. For example, configuration 235 may include data that defines one or more bytecode grammar that indicate one or more rules for converting instructions to alternate instructions, for example converting from JavaScript instructions to bytecode. Additionally or alternatively, configuration 235 may include data that indicates whether particular web pages should be processed by processing logic 334 and/or modified by bytecode conversion logic 336.

Configuration 235 may be modified by a user and/or administrator through one or more computers, such as intermediary computer 230, a computer in web infrastructure 205, and/or another computer not illustrated in system 200.

4.2.6 Storage

Storage 240 may be a database, a configuration file, and/or any other system and/or data structure that stores data. In FIG. 2, storage 240 is illustrated as if a separate computer from intermediary computer 230. Additionally or alternatively, storage 240 may be a data structure stored in memory on the one or more computers comprising intermediary computer 230. Additionally or alternatively, storage 240 may, at least in part, be a data structure stored in shared memory between one or more intermediary computers. Additionally or alternatively, intermediary computer 230 may, at least in part, be stored in volatile and/or non-volatile memory.

4.3 Browser

Browser 295 may be a browser as described herein and executed on a client computer, such as client computer 299. Additionally or alternatively, browser 295 may be a bot comprising one or more of the components traditionally found in a browser.

5.0 Process Overview

In an embodiment, a data processing method may be configured to intercept or receive instructions from a server computer that are directed toward a browser, generate one or more alternate instructions that are executable by an interpreter, and render a second set of instructions comprising the alternate instructions and the interpreter. In an embodiment, if the request is valid, then the processing method may be configured to modify the request, send the modified request to a server computer, receive data from the server computer in response to the modified request, and/or send a response to a client computer. Various embodiments may use standard web protocols, such as HTTP, and/or standard web-based instructions, such as HTML and/or JavaScript. Additionally or alternatively, other standard and/or proprietary protocols may be used. Additionally or alternatively, other standard and/or proprietary instructions may be used.

5.1 Receiving Instructions from a Server Computer

Figure 4:
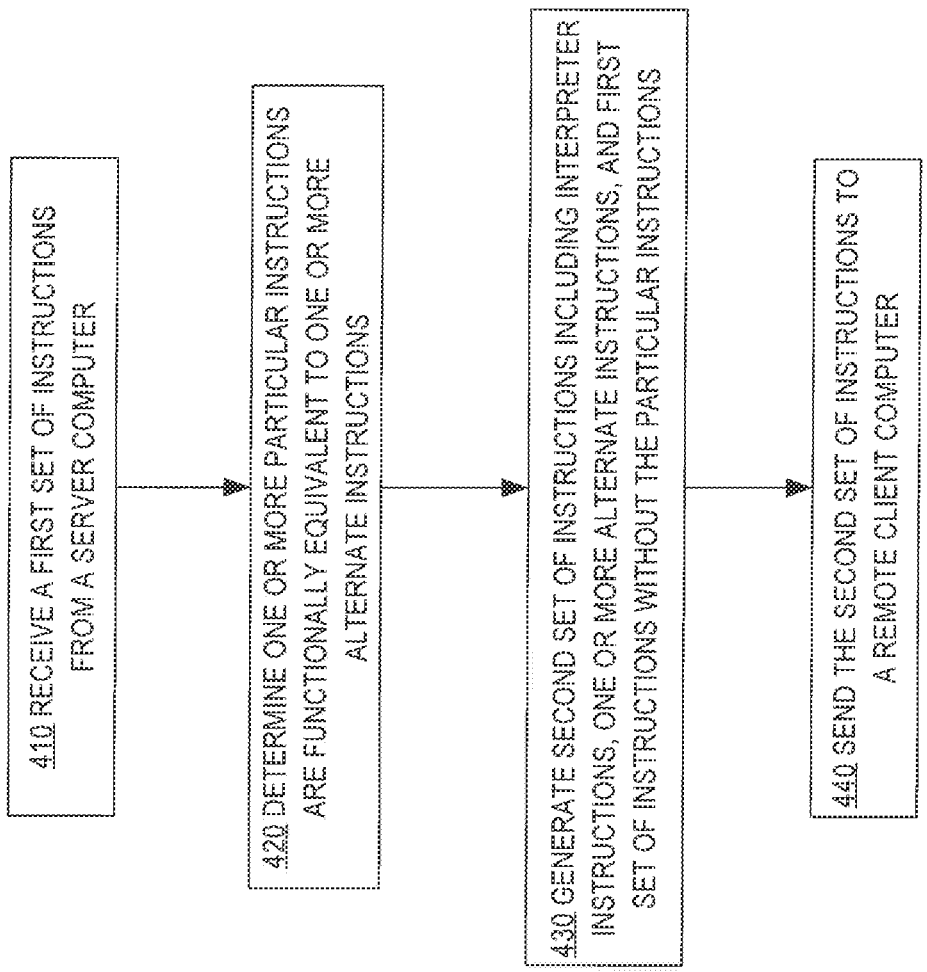
FIG. 4 illustrates a process for receiving one or more instructions from a server computer, generating one or more alternate instructions, and sending the one or more alternate instructions to the intended client, in an embodiment.

FIG. 4 illustrates a process for intercepting or receiving instructions from a server computer, generating new instructions, and sending the new instructions to the intended client, in an example embodiment. In step 410, an intermediary computer receives a first set of instructions from a remote server computer. For example, protocol client logic 332 may receive instructions from web infrastructure 205 in response to a request from visitor browser 295. The instructions may define one or more objects and one or more operations which operate on the objects. The instructions may comprise HTML, CSS, and/or JavaScript. As an example, protocol client logic 332 may receive original JavaScript file 120 and original HTML file 110, and send original JavaScript file 120 to processing logic 334.

5.2 Determining Alternate Instructions

In step 420, the intermediary computer determines that one or more particular instructions are functionally equivalent to one or more first alternate instructions. An alternate set of instructions may be functionally equivalent to an original set of instructions if when executed, given a particular set of one or more inputs, the alternate instructions produce the same output(s) or effect(s) as the original instructions when executed given the same particular set of one or more inputs. The alternate instructions may be executed in the same execution environment as the original instructions. Additionally or alternatively, one or more of the instructions in the alternate instructions may be executed by an interpreter that is not used to execute the one or more original instructions. The alternate instructions may comprise bytecode.

Processing logic 334 may parse the received instructions prior to sending them to bytecode conversion logic 336. Additionally or alternatively, processing logic 334 may generate one or more data structures representing the instructions in original JavaScript file 120, and then send the one or more data structures to bytecode conversion logic 336.

In an embodiment, processing logic 334 may parse the received instructions to generate a syntax tree for the received instructions. Additionally or alternatively, processing logic 334 may analyze the semantics of the received instructions and generate a data structure representing the semantics of the instructions. For example, processing logic may parse the received instructions and generate a semantic graph. Additionally or alternatively, processing logic 334 may perform type checking or scope checking on the received instructions.

For purposes of illustrating a clear example, assume that Snippet 1 is a method contained in original JavaScript file 120.

| Snippet 1 | |
| --- | --- |
| Line 01: | function func1( ) |
| Line 02: | { |
| Line 03: | var res = 1+2; |
| Line 04: | return res; |
| Line 05: | } |

Processing logic 334 may parse Snippet 1 to generate a syntax tree and/or a semantic graph. Processing logic 334 passes the one or more generated data structures to bytecode conversion logic 336.

Bytecode conversion logic 336 may generate one or more alternate instructions based on the one or more generated data structures. The alternate instructions may comprise bytecode instructions, which when executed by an interpreter, are functionally equivalent to the received instructions. Additionally or alternatively, each line of the alternate instructions may be mapped to one or more characters, numbers, or symbols that form bytecode instructions which may be understood by a bytecode interpreter.

In the present example, bytecode conversion logic 336 receives data structures describing the syntax and the semantics of the function "func1" in Snippet 1. Bytecode conversion logic 336 may map the semantics to a set of one or more semantically equivalent instructions.

Based on the instructions described in Snippet 1, bytecode conversion logic 336 generates the alternate instructions illustrated in Snippet 2 below, which are functionally equivalent to the instructions in Snippet 1. When executed by an interpreter, the alternate instructions in Snippet 2 perform the same steps as those illustrated by Snippet 1.

The bytecode instructions may correspond to a particular set of characters. For example, the addition operator may correspond to the string "aa." When the interpreter reads the string "aa," it performs the addition operation. Additionally or alternatively, the particular interpreter reads additional bytes to use as arguments for the instructions. Additionally or alternatively, the particular interpreter receives additional parameters to use as arguments for the instructions.

---

Snippet 2

```
Line 01:    function func1( )
Line 02:    {
Line 03:        var res = interpreter(1, 2, "aa");
Line 04:        return res;
Line 05:    }
```

---

Snippet 2 is a function that comprises alternate instructions which replace the addition operation in Snippet 1 with a call to an "interpreter" function. The "interpreter" function may be a bytecode interpreter associated with Snippet 2. The parameters for the "interpreter" function include the parameters for the addition operation in Snippet 1 and bytecode that corresponds to the addition operation.

In the present example, the alternate instructions in Snippet 2 correspond to the addition operation in function "func1." In other embodiments, the alternate instructions may include instructions that define other portions of function "func1" including the entirety of function "func1." Additionally or alternatively, the alternate instructions may include instructions that define one or more objects, data, structured data, parameters, classes, namespaces, functions, and etc. A call to a function defined in the alternate instructions may cause an interpreter to execute the alternate instructions. Additionally or alternatively, the alternate instructions may include a data structure that comprises bytecode instructions, as well as other information that the interpreter may use for executing the bytecode instructions. One or more bytecode instructions may be packed into a byte array, which can be encoded into a string. An interpreter may decode the string, unpack the byte array, and read the bytes in the byte array. For example, Snippet 3 illustrates bytecode which, when executed by an interpreter, defines a function "func1" from Snippet 1.

Snippet 3

Line 01: interpreter ("aXbbpQwcd0aa", ["func1"]);

An interpreter may decode the string "aXbbpQwcd0aa," unpack the byte array, and/or read the bytes in the byte array to execute the instruction(s) associated with each byte to define "func1" in Snippet 3 as if the execution environment, which is executing the interpreter, had executed the code in Snippet 1 defining function "func1."

Additionally or alternatively, if execution of the original instructions would have returned a value or stored a value in a parameter, then execution of the alternate instructions using an interpreter also returns the same value or stores the value in the same parameter. In an embodiment, the interpreter receives a reference to one or more parameters that were passed as parameters to the original instructions. The interpreter may use the reference to retrieve the parameter value for the original instructions, or to store results in the passed parameter.

5.2.1 Additional Example

Representing a program as bytecodes makes it easier to obscure the behavior of the program. Human-readable source code may be represented by at least one series of bytecodes, but one or more series of bytecodes need not directly represent some human-readable source code. Accordingly, the process of "decompiling" a series of bytecodes, to produce equivalent human-readable source, can be extremely difficult, especially if the original compiler is designed to make decompilation difficult. For example, assume Snippet 4 is a method contained in original JavaScript file 120.

---

Snippet 4

```
Line 01:    function fold1(f, acc, list)
Line 02:    {
Line 03:        for (var i=0; i<list.length; ++i)
Line 04:        {
Line 05:            acc = f(acc, list[i]);
Line 06:        }
Line 07:        console.log(acc);
Line 08:        return acc;
Line 09:    }
```

---

Processing logic 334 may parse Snippet 4 to generate a syntax tree and/or a semantic graph. Processing logic 334 passes the one or more generated data structures to bytecode conversion logic 336.

Bytecode conversion logic 336 may generate one or more alternate instructions based on the one or more generated data structures. For example, bytecode conversion logic 336 may generate following code in Snippet 5.

---

Snippet 5

```
0: PUSH_FUN 0
1: ASSIGN_GLOBAL "fold1"
2: TERM

0: PUSH_IMMEDIATE_INT 0
1: ASSIGN_LOCAL 0
2: TARGET
3: DEREF_LOCAL 0
4: DEREF_LOCAL 1
5: PUSH_STRING "length"
6: GET_PROPERTY
7: LT
8: BRANCH_IF_TRUE 10
9: GOTO 24
10: TARGET
11: DEREF_LOCAL 2
12: DEREF_LOCAL 3
13: DEREF_LOCAL 1
14: DEREF_LOCAL 0
15: GET_PROPERTY
16: CALL2
17: ASSIGN_LOCAL 3
18: DEREF_LOCAL 0
19: COERCE_NUMBER
20: PUSH_IMMEDIATE_INT 1
21: PLUS
22: ASSIGN_LOCAL 0
23: GOTO 2
24: TARGET
25: DEREF_GLOBAL "console"
```

Snippet 5

```
26: ASSIGN_LOCAL 4
27: DEREF_LOCAL 4
28: PUSH_STRING "log"
29: GET_PROPERTY
30: DEREF_LOCAL 4
31: DEREF_LOCAL 3
32: CALL 1
33: POP
34: DEREF_LOCAL 3
35: RETURN
```

In Snippet 5, the lines are numbered differently from other snippets so that an instruction that references another instruction at a target location refers to the line number of the target instruction. For example, line 23 in Snippet 5 has a GOTO instruction that references line 2 in Snippet 5, "TARGET".

Each line in Snippet 5 may be mapped to one or more characters, numbers, or symbols that form bytecode instructions which may be understood by a bytecode interpreter. A particular interpreter may expect each instruction in Snippet 5 to correspond to a particular number. For example, "PUSH_IMMEDIATE_INT" may correspond to the number 14. When the particular interpreter reads the number 14, it executes the "PUSH_IMMEDIATE_INT" instruction. Thus, when executed by an interpreter, the alternate instructions in Snippet 6 perform the same steps as those illustrated by Snippet 5.

Snippet 6

```
Line 01: {
Line 02: code: "EgAAAwAAUg==",
Line 03: functions: [{
Line 04:    code:
            "DgAABQAABwAABwABEAABCCdQABdPADYHAAIHAA
            MHAAEHAAAISAUAAwcAADQOAAEcBQAATwAGBgACB
            QAEBwAEEAADCAcABAcAAOUAAQIHAANL",
Line 05:    parameters: [2, 3, 1],
Line 06:    locals: [0, 1, 2, 3, 4],
Line 07: }],
Line 08: objects: ["fold1", "length", "console",
            "log"],
Line 09: scriptVarDecls: ["fold1"]
Line 10: }
```

Snippet 6 is a data structure that comprises bytecode instructions, as well as other information that the interpreter may use for executing the bytecode instructions. For example, the data structure in Snippet 6 comprises substructures "functions," "objects," and "scriptVarDecls." "Objects" and "scriptVarDecls" are arrays that indicate the global variables and strings used when executing the bytecode instructions, as seen above in Snippet 5. In other embodiments, the alternate instructions generated by bytecode conversion logic may be stored in different formats or may not require use of a data structure.

The data structure in Snippet 6 comprises two "code" fields, each of which includes a set of bytecodes encoded as a base64 string. A corresponding interpreter can execute the first set of bytecodes on line 2, which causes the interpreter to define the global object "fold1," as illustrated in the first section of Snippet 5. The interpreter can execute the second set of bytecodes on line 4, which causes the interpreter to define the behavior of the global object "fold1," as illustrated in the second section of Snippet 5. Code, a runtime environment, or an interpreter may reference or call the global object or function "fold1" as if "fold1" had been defined using the code in Snippet 4.

In Snippet 6, the "functions" field is an array of one or more functions. For purposes of illustrating a clear example, the "functions" field defines a single function. Each function in the array comprises "code," "parameters," and "locals." The "code" field on line 4 is an array of bytecodes stored as a base64-encoded string.

The "parameters" field on line 5 is an array of parameters. Each element in the array may be the name of the parameter. For example, the first element of the parameters array, 2, corresponds to the first parameter, "f", on line 1 of Snippet 4. Therefore, "DEREF_LOCAL 2", on line 11 of Snippet 5, retrieves the first parameter on line 1 of Snippet 4.

The "locals" field on line 6 is an array that indicates the local variables used in the function. In Snippet 6, the "locals" field includes variables zero through four because variables zero through four are referenced in the instructions in Snippet 5.

The "objects" field may include zero or more objects that may be used by the bytecode. For example, "length", from line 5 of Snippet 5, is stored in the "objects" field. The bytecode on line 4 can include a reference or index to "length" in the "objects" field, instead of including "length" as a string in the bytecode.

The "scriptVarDecls" field identifies one or more variables that should be declared before the interpreter executes the bytecode. The one or more variables need not be defined, instantiated, or assigned one or more values or objects.

Execution of the alternate instructions using a corresponding interpreter may return the same value(s) or store the value(s) in the same parameter(s) as the original instructions if the original instructions were executed. The interpreter may use objects, variables, or references to retrieve data from, or store data to, one or more objects or variables.

5.2.2 Generating Alternate Sets of Functionally Equivalent Code and Corresponding Interpreters Additionally or alternatively, bytecode conversion logic 336 may generate a first set of bytecode instructions for a first interpreter to be used for executing the first set of bytecode instructions. As an example, in Snippet 2, the addition operation is represented in the bytecode instructions ("aa") for a first interpreter. Other instructions may be represented by other sets of characters for the first interpreter. The characters are interpreted by the first interpreter to perform the instruction(s) indicated in Snippet 1. For a second interpreter, the addition operation may be associated with a different set of numbers, letters, and/or characters. Thus, for a second interpreter, bytecode conversion logic 336 may generate a second set of bytecode instructions different from the first set of bytecode instructions. Both the second set of bytecode instructions when executed by the second interpreter, and the first set of bytecode instructions when executed by the first interpreter, in a particular execution environment, are functionally equivalent to the original JavaScript instructions executed in the particular execution environment. For a particular set of JavaScript instructions, bytecode conversion logic 336 may generate a different version of the corresponding bytecode for each interpreter in a plurality of interpreters.

Additionally or alternatively, bytecode conversion logic 336 may select a bytecode interpreter from a plurality of bytecode interpreters for generating the bytecode instructions. The selection may be done randomly, or based on user configurations, for example, data stored in configuration 235. For example, bytecode conversion logic 336 may determine that a particular set of JavaScript code is functionally equivalent to a first set of bytecode with a first interpreter and a second set of bytecode with a second interpreter. In response, bytecode conversion logic 336 use a random number generator to select the first set of bytecode or the second set of bytecode by using a random number generator. For purposes of illustrating a clear example, assume the random number generator returns a one, wherein zero is the index of the first alternate set of bytecode. Bytecode conversion logic 336 uses the random number to index into the plurality of functionally equivalent bytecodes and interpreters, and select the second set of bytecode and interpreter. Bytecode conversion logic 336 may replace the particular set of JavaScript code in a web page with the selected set of bytecode and the particular computer.

5.3 Generating and Sending Alternate Instructions

In step 430, the intermediary computer generates a second set of instructions. The second set of instructions may comprise interpreter instructions that define an interpreter that executes the one or more alternate instructions, the one or more alternate instructions, and the first set of instructions without the particular instructions.

The one or more alternate instructions may comprise bytecode instructions. The interpreter instructions may comprise JavaScript instructions that define a JavaScript interpreter configured to execute the bytecode instructions. The second set of instructions may be generated by replacing one or more portions of JavaScript code from the first set of instructions with one or more bytecode instructions.

The second set of instructions may include a modified HTML file, such as modified HTML file 130. The modified HTML file 130 may include a reference to a file containing the interpreter instructions, such as interpreter reference 135, and a reference to a file containing the bytecode instructions, such as bytecode instruction reference 137. Additionally or alternatively, modified HTML file may include the bytecode interpreter instructions and the bytecode instructions.

Additionally or alternatively, the intermediary computer may obfuscate the one or more alternate instructions. For the purpose of illustrating a clear example, assume the one or more alternate instructions comprise bytecode. The intermediary computer may obfuscate the bytecode using, for example, opcode shuffling or other bytecode obfuscation techniques.

In step 440, the intermediary computer sends the generated, second set of instructions to the client computer. For example, bytecode conversion logic 336 may send the generated instructions to protocol server logic 338. Protocol server logic 338 sends the generated instructions to visitor browser 295, which was the originally intended recipient of the data received in step 410.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
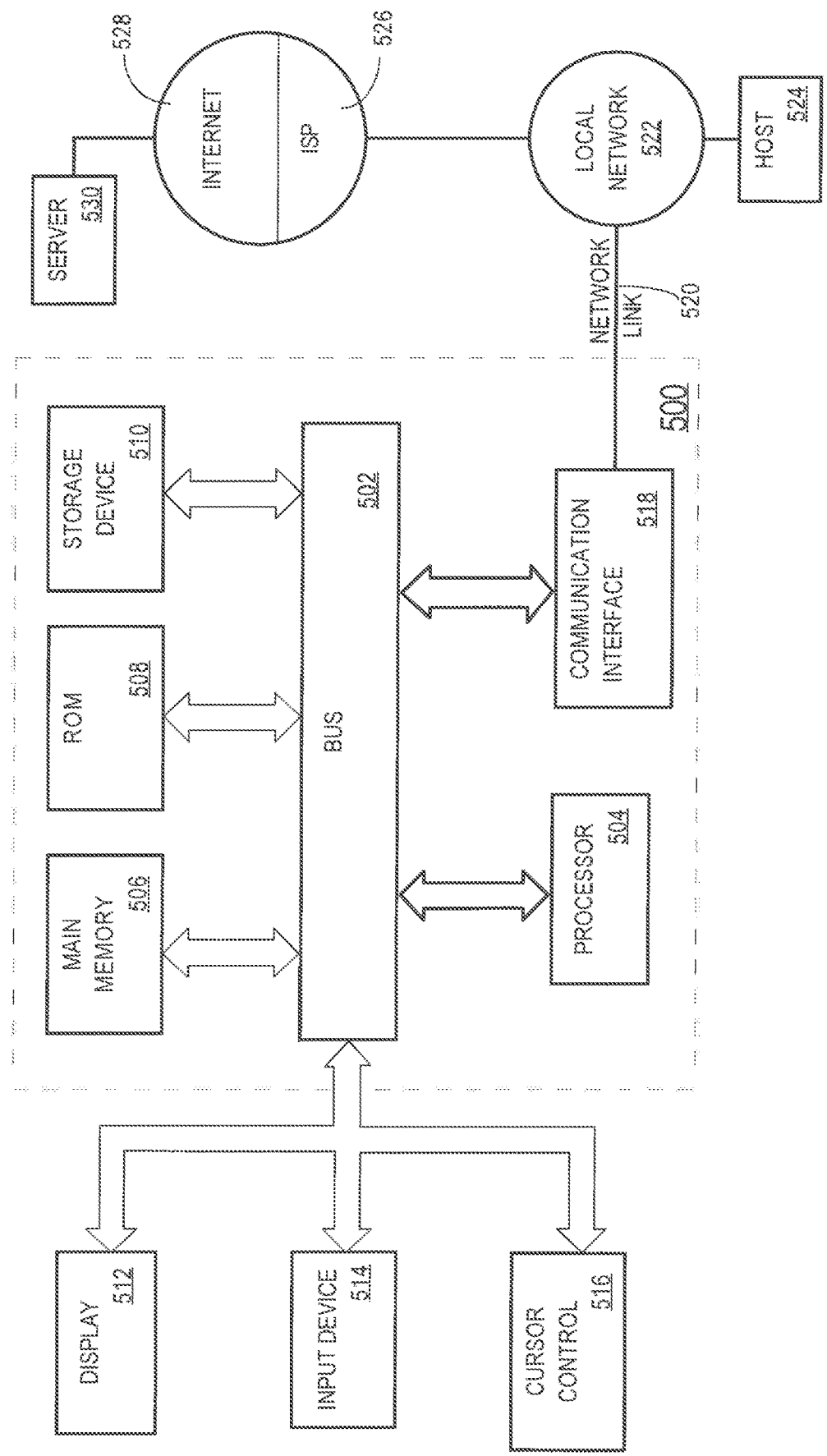
FIG. 5 illustrates a computer system in which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7.0 Other Aspects of Disclosure

Using the networked computer arrangements, intermediary computer, or processing methods described herein, security in client-server data processing may be significantly increased. Polymorphic techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities, are frustrated because object identifiers or polymorphic hooks may change over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Aspects of the subject matter described herein are set out in the following numbered clauses:

1. A computer system configured to improve security of client computers interacting with server computers, the computer system comprising: one or more processors; a digital electronic memory storing a set of program instructions which when executed using the one or more processors cause the one or more processors to: process a first set of original instructions that produce a first set of outputs or effects when executed by a first client computer; generate a first set of interpreter instructions that define a first interpreter; generate a first set of alternate instructions from the first set of original instructions, wherein the first set of alternate instructions is functionally equivalent to the first set of original instructions when the first set of alternate instructions is executed by the first interpreter; send, to the first client computer, the first set of alternate instructions and the first set of interpreter instructions, wherein the first set of interpreter instructions and the first set of alternate instructions cause the first client computer to produce the first set of outputs or effects when executed by the first client computer.

2. The computer system of Clause 1, wherein the first interpreter is a bytecode interpreter and the first set of alternate instructions comprises one or more bytecodes.

3. The computer system of any Clause 1-2, wherein: the set of program instructions cause the one or more processors to process the first set of original instructions by generating, in memory, one or more data structures based on the first set of original instructions; and the first set of alternate instructions is generated based on the one or more data structures.

4. The computer system of any Clause 1-3, wherein the one or more data structures include an abstract representation of the first set of original instructions.

5. The computer system of any Clause 1-4, wherein the abstract representation of the first set of original instructions identifies one or more semantics of the first set of original instructions.

6. The computer system of any Clause 1-5, wherein: the set of program instructions causes the one or more processors to generate a second set of interpreter instructions and a second set of alternate instructions; the second set of alternate instructions and the second set of interpreter instructions are functionally equivalent to the first set of alternate instructions and the first set of interpreter instructions; the second set of alternate instructions is different than the first set of alternate instructions; the second set of interpreter instructions is different than the second set of interpreter instructions.

7. The computer system of any Clause 1-6, wherein: the first set of interpreter instructions associates a first bytecode with a particular operation; the second set of interpreter instructions associates a second bytecode with the particular operation; the first bytecode is different than the second bytecode; the first set of alternate instructions include the first bytecode and the second set of alternate instructions includes the second bytecode.

8. The computer system of any Clause 1-7, wherein executing the set of program instructions causes the one or more processors to receive the first set of original instructions from a server computer over one or more computer networks.

9. The computer system of any Clause 1-8, wherein the set of program instructions cause the one or more processors to: process a second set of original instructions that produce a second set of outputs or effects when executed by a second client computer, wherein the second set of original instructions are different than the first set of original instructions; generate a second set of interpreter instructions that define a second interpreter; generate a second set of alternate instructions from the second set of original instructions, wherein the second set of alternate instructions is functionally equivalent to the second set of original instructions when the second set of alternate instructions is executed by the second interpreter; send, to the second client computer, the first set of alternate instructions and the first set of interpreter instructions, wherein the first set of interpreter instructions and the first set of alternate instructions, when executed by the second client computer, cause the second client computer to produce the second set of outputs or effects.

10. The computer system of any Clause 1-9, wherein the first interpreter and the second interpreter are different interpreters with different instruction sets.

11. The computer system of any Clause 1-10, wherein the set of program instructions cause the one or more processors to: process a first set of JavaScript code that produce a set of outputs or effects when executed by a JavaScript runtime environment on a first client computer; generate a second set of JavaScript code that defines a bytecode interpreter; generate a set of bytecode from the first set of JavaScript code, wherein the set of bytecode is functionally equivalent to the first set of JavaScript code when the set of bytecode is executed by the bytecode interpreter; send, to the first client computer, the set of bytecode and the second set of JavaScript code that defines the bytecode interpreter, wherein the set of bytecode and the second set of JavaScript code that defines the bytecode interpreter cause the first client computer to produce the set of outputs or effects when executed by the first client computer.

12. The computer system of any Clause 1-11, wherein the set of program instructions cause the one or more processors to: one or more processors; a digital electronic memory storing a set of program instructions which when executed using the one or more processors cause the one or more processors to: receive, from a server computer, a first set of instructions that define one or more objects and one or more operations, which when executed by a client computer operate on the one or more objects; determine that the first set of instructions comprises one or more particular instructions that are functionally equivalent to one or more first alternate instructions when the one or more first alternate instructions are executed by an interpreter; generate a second set of instructions that includes a set of interpreter instructions that define the interpreter, the one or more first alternate instructions, and the first set of instructions without the one or more particular instructions; send the second set of instructions to a remote client computer.

13. The computer system of any Clause 1-12, wherein the interpreter is a bytecode interpreter.

14. The computer system of any Clause 1-13, wherein the one or more first alternate instructions comprise a set of bytecode instructions.

15. The computer system of any Clause 1-14, wherein executing the set of program instructions causes the one or more processors to modify the set of bytecode instructions prior to sending the second set of instructions to the remote client computer.

16. The computer system of any Clause 1-15, wherein executing the set of program instructions causes the one or more processors to: generate, in memory, one or more data structures that are associated with the one or more objects and the one or more operations; and determine, based on the one or more data structures, that the one or more particular instructions are functionally equivalent to the one or more first alternate instructions when the one or more first alternate instructions are executed by the interpreter.

17. The computer system of any Clause 1-16, wherein the one or more data structures describe at least one of: a syntax of the one or more objects and the one or more operations, or one or more semantics of the one or more objects and the one or more operations.

18. The computer system of any Clause 1-17, wherein the one or more particular instructions are functionally equivalent to a plurality of alternative instruction sets, and wherein executing the set of program instructions causes the one or more processors to select the one or more first alternate instructions from the plurality of alternative instruction sets prior to generating the second set of instructions.

19. A method comprising one or more steps of any Clause 1-18.

20. A computer system performing one or more steps of any Clause 1-18.

What is claimed is:

1. A computing device, comprising memory comprising programmed instructions stored thereon and one or more processors configured to be capable of executing the stored programmed instructions to:
  obtain a first set of original instructions associated with content requested by a client, wherein the first set of original instructions is configured to, when executed, produce a first result;

generate a first set of alternate instructions from the first set of original instructions, wherein the first set of alternate instructions is functionally equivalent to the first set of original instructions when the first set of alternate instructions is executed by a first interpreter;

generate a first set of interpreter instructions that define the first interpreter and are configured to, when executed by a browser, configure a JavaScript runtime environment (JRE) of the browser to interpret the first set of alternate instructions; and send, to the client, the first set of alternate instructions and the first set of interpreter instructions, wherein the first set of interpreter instructions and the first set of alternate instructions are configured to, when executed, produce the first result.

2. The computing device of claim 1, wherein the first interpreter is a bytecode interpreter and the first set of alternate instructions comprises one or more bytecodes.

3. The computing device of claim 1, wherein the processors are further configured to be capable of executing the stored programmed instructions to generate, in the memory, one or more data structures based on the first set of original instructions and the first set of alternate instructions is generated based on the data structures.

4. The computing device of claim 3, wherein the one or more data structures include an abstract representation of the first set of original instructions and the abstract representation of the first set of original instructions identifies one or more semantics of the first set of original instructions.

5. The computing device of claim 1, wherein the first set of interpreter instructions associates a first bytecode with a particular operation and the first set of alternate instructions includes the first bytecode.

6. A network security method implemented by a network security system comprising one or more intermediary devices, server devices, or client devices, the method comprising:

obtaining a first set of original instructions associated with content requested by a client, wherein the first set of original instructions is configured to, when executed, produce a first result;

generating a first set of alternate instructions from the first set of original instructions, wherein the first set of alternate instructions is functionally equivalent to the first set of original instructions when the first set of alternate instructions is executed by a first interpreter;

generating a first set of interpreter instructions that define the first interpreter and are configured to, when executed by a browser, configure a JavaScript runtime environment (JRE) of the browser to interpret the first set of alternate instructions; and sending, to the client, the first set of alternate instructions and the first set of interpreter instructions, wherein the first set of interpreter instructions and the first set of alternate instructions are configured to, when executed, produce the first result.

7. The network security method of claim 6, wherein the first interpreter is a bytecode interpreter and the first set of alternate instructions comprises one or more bytecodes.

8. The network security method of claim 6, further comprising generating one or more data structures based on the first set of original instructions and the first set of alternate instructions is generated based on the data structures.

9. The network security method of claim 8, wherein the data structures include an abstract representation of the first set of original instructions and the abstract representation of the first set of original instructions identifies one or more semantics of the first set of original instructions.

10. The network security method of claim 6, wherein the first set of interpreter instructions associates a first bytecode with a particular operation and the first set of alternate instructions includes the first bytecode.

11. A non-transitory computer readable medium having stored thereon instructions for network security comprising executable code that, when executed by one or more processors, causes the processors to:

obtain a first set of original instructions associated with content requested by a client, wherein the first set of original instructions is configured to, when executed, produce a first result;

generate a first set of alternate instructions from the first set of original instructions, wherein the first set of alternate instructions is functionally equivalent to the first set of original instructions when the first set of alternate instructions is executed by a first interpreter;

generate a first set of interpreter instructions that define the first interpreter and are configured to, when executed by a browser, configure a JavaScript runtime environment (JRE) of the browser to interpret the first set of alternate instructions; and send, to the client, the first set of alternate instructions and the first set of interpreter instructions, wherein the first set of interpreter instructions and the first set of alternate instructions are configured to, when executed, produce the first result.

12. The non-transitory computer readable medium of claim 11, wherein the first interpreter is a bytecode interpreter and the first set of alternate instructions comprises one or more bytecodes.

13. The non-transitory computer readable medium of claim 11, wherein the executable code, when executed by the processors, further causes the processors to generate one or more data structures based on the first set of original instructions and the first set of alternate instructions is generated based on the data structures.

14. The non-transitory computer readable medium of claim 13, wherein the data structures include an abstract representation of the first set of original instructions and the abstract representation of the first set of original instructions identifies one or more semantics of the first set of original instructions.

15. The non-transitory computer readable medium of claim 11, wherein the first set of interpreter instructions associates a first bytecode with a particular operation and the first set of alternate instructions includes the first bytecode.

16. A network security system, comprising one or more intermediary devices, server devices, or client devices with memory comprising programmed instructions stored thereon and one or more processors configured to be capable of executing the stored programmed instructions to:

obtain a first set of original instructions associated with content requested by a client, wherein the first set of original instructions is configured to, when executed, produce a first result;

generate a first set of alternate instructions from the first set of original instructions, wherein the first set of alternate instructions is functionally equivalent to the first set of original instructions when the first set of alternate instructions is executed by a first interpreter;

generate a first set of interpreter instructions that define the first interpreter and are configured to, when executed by a browser, configure a JavaScript runtime environment (JRE) of the browser to interpret the first set of alternate instructions; and send, to the client, the first set of alternate instructions and the first set of interpreter instructions, wherein the first set of interpreter instructions and the first set of alternate instructions are configured to, when executed, produce the first result.

17. The network security system of claim 16, wherein the first interpreter is a bytecode interpreter and the first set of alternate instructions comprises one or more bytecodes.

18. The network security system of claim 16, wherein the processors are further configured to be capable of executing the stored programmed instructions to generate, in the memory, one or more data structures based on the first set of original instructions and the first set of alternate instructions is generated based on the data structures.

19. The network security system of claim 18, wherein the data structures include an abstract representation of the first set of original instructions and the abstract representation of the first set of original instructions identifies one or more semantics of the first set of original instructions.

20. The network security system of claim 16, wherein the first set of interpreter instructions associates a first bytecode with a particular operation and the first set of alternate instructions includes the first bytecode.

\* \* \* \* \*